United States Patent Office 3,540,006
Patented Nov. 10, 1970

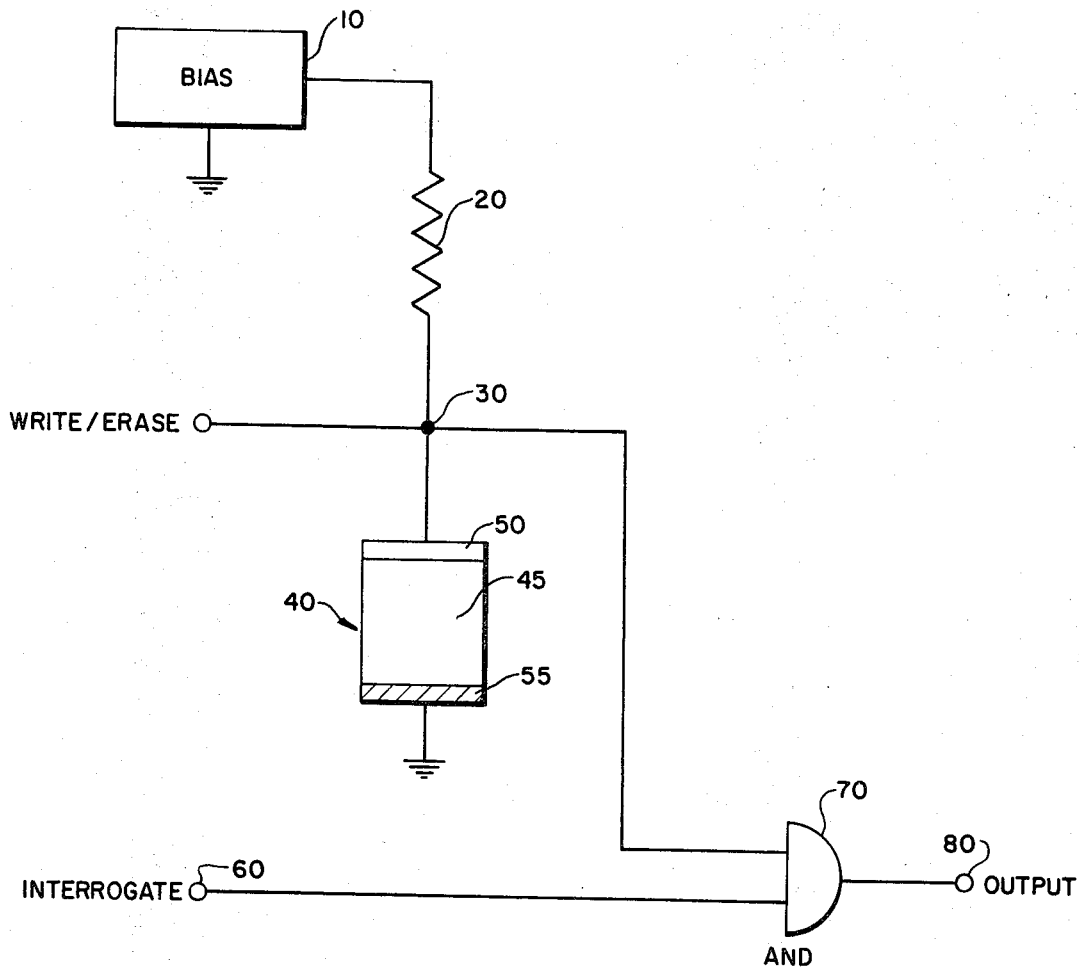

3,540,006
ELECTROCHEMICAL COMPUTER MEMORY DEVICE
George Lauer, Hollywood, Calif., assignor to North American Rockwell Corporation
Filed Aug. 30, 1967, Ser. No. 664,467
Int. Cl. H03k *4/88;* G11c *13/02*
U.S. Cl. 340—173
4 Claims

ABSTRACT OF THE DISCLOSURE

A nonvolatile memory device employs a solid state electrochemical capacitor which becomes either conducting or nonconducting after being pulsed by a current of sufficient amplitude and polarity and remains in such conducting or nonconducting state until re-pulsed by a current of opposite polarity and sufficient amplitude.

BACKGROUND OF INVENTION

This device relates to nonvolatile memory devices and particularly to such devices utilizing solid state electrochemical components.

The primary disadvantage of existing computer memory devices is their volatility, i.e., sensitivity to external factors such as radiation, temperature or magnetic fields which may affect their dormant state and make them unreliable. Prior art electrochemical memory devices require corrosive liquids and thus are dangerous to surrounding circuitry.

SUMMARY OF INVENTION

Applicant's device uses a solid state electrochemical capacitor described more fully in the application of Douglas Raleigh entitled "Solid State Device," Ser. No. 655,975, filed June 9, 1967, now U.S. Pat. No. 3,419,760, the disclosure of which is incorporated herein by reference. The capacitor is coupled with a bias source and an AND gate to provide a computer memory element which is unaffected by power failures, interim temperature changes, magnetic fields or radiation.

BRIEF DESCRIPTION OF THE DRAWING

The figure is a circuit diagram of the preferred embodiment of the invention.

DESCRIPTION OF PREFERRED EMBODIMENT

Referring now to the figure in detail, the preferred embodiment is shown as comprising a source of biasing voltage 10 connected through resistance 20 to write/erase input at point 30, one end of a solid state capacitor 40 and one input of an AND gate 70. The other end of the solid state capacitor 40 is connected to ground. The other input 60 of AND gate 70 receives interrogation signals.

In operation bias source 10 supplies one half the voltage required to cause the solid ionic electrolyte 45 to decompose. When a current pulse is applied at 30 of sufficient amplitude and duration at an initially critical voltage to cause the ionic electrolyte 45 to decompose and the metallic component to plate onto the blocking electrode 55, the device is thereafter conducting even though the pulse and/or bias 10 is removed. If a current pulse of opposite polarity and sufficient amplitude is now applied at 30 the blocking electrode 55 will unplate and the metallic ions recombine with the rest of the ionic electrolyte making the capacitor 40 nonconducting.

In a nonconducting state capacitor 40 has a high resistance relative to resistance 20 and nearly the full value of bias 10 appears at point 30 and one input to AND gate 70. If an interrogation pulse is applied at 60 to the other input to AND gate 70 an output pulse will be generated at 80. If the capacitor 40 is in a conducting state, point 30 is at ground potential and an interrogation pulse at 60 produces no output from AND gate 70.

Thus, a binary singal may be "stored" by making capacitor 40 nonconducting and "retrieved" by an interrogation pulse at 60. The stored signal can also be "erased" by making the capacitor 40 conducting as discussed above.

The preferred embodiment utilizes a solid state capacitor comprised of a platinum blocking electrode 55, a silver electrode 50 and an ionic electrolyte 45, all of which are encapsulated in vinyl or other inert insulating material.

The electrolyte 45 of the preferred embodiment is $RbAG_4I_5$. However, other electrode and solid ionic conductor materials may be utilized. The criteria are that the solid ionic conductor have a contacting interface with a metallic electrode which is inert with respect to the solid ionic conductor and a second contacting interface with an electrode able to accept or donate ions to the solid ionic conductor by means of a reversible electrode reaction. A wide variety of electrode/solid ionic conductor/electrode systems are disclosed in the above mentioned application of Douglas O. Raleigh and in copending applications of Argue et al., Ser. No. 569,193, entitled "Solid Ionic Conductors" and Bone B. Owens, Ser. No. 651,499, entitled "Solid Electrolytes," the disclosures of which are incorporated herein by reference.

The metallic electrodes 50 and 55 of the capacitor 40 are each .05 centimer thick and 1 square centimeter in area. The electrolyte 45 is .01 centimeter thick and also 1 square centimenter in cross-sectional area. The plating process is strictly a function of the amount of charge passed into the capacitor 40. Two hundred microcoulombs were required in the preferred embodiment to make the capacitor 40 conducting.

The charge is a product of the current and time, and once the initial critical voltage is reached and the ionic electrolyte 45 starts to decompose, the conductivity of capacitor 40 is dependent on the amplitude of the write/erase current pulse and its time width. Thus, with .3 v. as a bias source 10 connected through a 100,000 ohm resistor 20, a signal of 1 milliamp for 0.2 second or 5 milliamps for 0.04 second at 0.8 volt at 30 was required to write or erase. The polarity was such that the silver electrode 50 was positive relative to blocking electrode 55 to make the capacitor 40 conducting and of the opposite polarity to make it nonconducting. In a conducting state the voltage drop across capacitor 40 due to bias 10 was less than 5 microvolts.

Because the conductivity of capacitor 40 is dependent on an internal physical change, i.e., the plating of blocking electrode 55, which is not transitory as in the case of the semiconductor switch, the stored signal will not be erased by exposure to radiation, magnetic fields, or changes in temperature. Further, since he device is completely solid state there is no danger of damage to other circuitry from corrosive liquids which are used in prior art electrochemical memory devices.

Although particular embodiments of the present invention have been described, various modifications will be apparent to those skilled in the art without departing from the scope of the invention. For example, other logic circuits such as a NAND gate, an OR gate, or an anticoincidence circuit such as an exclusive OR gate could replace AND gate 70 depending on the requirements of the system in which the device is used. Such logic circuits are well-known in the art and so AND gate 70 was not shown in detail. It would also be possible to insert amplifying means between input 30 and a logic circuit input which required a higher voltage input than that appearing at input 30. The present invention is not limited to the specific embodiment disclosed but only by the appended claims.

I claim:

1. A nonvolatile memory device for computers comprising electrochemical means having a pair of electrodes and a solid ionic electrolyte, means for applying current pulses of specified duration, amplitude and polarity and at a determined voltage to said electrochemical means so that it can be made either a conductor or nonconductor of electric current, an input connected to said device, and means for monitoring the conducting state of said device.

2. The device of claim 1 wherein said monitoring means includes means for generating a voltage of less than sufficient potential to affect the conductivity of said electrochemical means to which it is connected in series, resistance means connected in series with said voltage generating means and said electrochemical means, and voltage sensing means responsive to the difference between voltage drops across said electrochemical means in its conducting and nonconducting states for generating an output characteristic of the conductivity state of said electrochemical means.

3. The device of claim 2 wherein said voltage sensing means includes a logic circuit whose output is dependent on at least a first and a second input to said logic circuit, said first input being responsive to the difference in voltage drops across said electrochemical means in its conducting and nonconducting states, and said second input being responsive to said input to said permanent memory device.

4. The device of claim 1 wherein said monitoring device is comprised of a source of voltage of less than sufficient potential to affect the conductivity of said electrochemical means connected to a voltage divider circuit having said electrochemical means as one branch and a resistance means as another branch, a logic means whose output is dependent on the coincidence in time of signals applied to a first and a second input to said logic circuit, the first of said inputs being responsive to the voltage level when the electrochemical means is in a particular conducting state at the point where said electrochemical means joins said resistance means, the second of said inputs being responsive to the input to said permanent memory device.

References Cited
UNITED STATES PATENTS

| | | | |
|---|---|---|---|
| 3,017,612 | 1/1962 | Singer | 340—173 |
| 3,211,968 | 10/1965 | Grams | 340—173 |

TERRELL W. FEARS, Primary Examiner

U.S. Cl. X.R.

317—230